(12) United States Patent
Suzuki et al.

(10) Patent No.: US 12,437,781 B2
(45) Date of Patent: Oct. 7, 2025

(54) GLASS SHEET FOR FABRICATING MAGNETIC RECORDING MEDIA AND METHOD OF FABRICATING MAGNETIC RECORDING MEDIA

(71) Applicant: Western Digital Technologies, Inc., San Jose, CA (US)

(72) Inventors: Shoji Suzuki, San Jose, CA (US); Mary Grace Shieh, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 271 days.

(21) Appl. No.: 17/955,403

(22) Filed: Sep. 28, 2022

(65) Prior Publication Data

US 2024/0101463 A1    Mar. 28, 2024

(51) Int. Cl.
 *G11B 5/73*  (2006.01)
 *C03B 33/04* (2006.01)
 *G11B 5/84*  (2006.01)

(52) U.S. Cl.
 CPC ........ *G11B 5/73921* (2019.05); *G11B 5/8404* (2013.01); *C03B 33/04* (2013.01)

(58) Field of Classification Search
 CPC ..... G11B 5/73921; G11B 5/84; G11B 5/8404; C02B 33/04; C02B 33/02; C02B 33/0222; C02B 33/10; C02B 33/102
 See application file for complete search history.

(56) References Cited

U.S. PATENT DOCUMENTS

| | | | |
|---|---|---|---|
| 7,604,882 B2 | 10/2009 | Kezuka et al. | |
| 8,383,196 B2 * | 2/2013 | Marquez | G11B 5/8404 83/13 |
| 8,623,530 B2 | 1/2014 | Kitsunai et al. | |
| 9,105,293 B2 | 8/2015 | Kitsunai et al. | |
| 2002/0001738 A1 | 1/2002 | Uhlik et al. | |
| 2007/0243421 A1 | 10/2007 | Machida et al. | |
| 2010/0273030 A1 * | 10/2010 | Kitsunai | G11B 5/82 427/128 |

FOREIGN PATENT DOCUMENTS

| | | | | |
|---|---|---|---|---|
| JP | 2009199721 A | 9/2009 | | |
| WO | WO-2009084534 A1 * | 7/2009 | ........... | G11B 5/7315 |

OTHER PUBLICATIONS

English translation of WO-2009084534-A1, Kitsunai Kouji, Jul. 9, 2009 (Year: 2009).*

* cited by examiner

*Primary Examiner* — Holly Rickman
(74) *Attorney, Agent, or Firm* — LOZA & LOZA, LLP; Gabriel Fitch

(57) ABSTRACT

A glass sheet configured to be cut into glass substrates for magnetic recording disks is described. The glass sheet includes a first surface. For surface features of the first surface with a feature wavelength of 60 to 500 micrometers (μm), a root mean square of a surface topography of the surface features determined using a surface analysis on the first surface with incident and reflected light is given as a microwaviness. A maximum value of the microwaviness of any arbitrary region of the first surface may be between 1.2 nanometers (nm) and 2.8 nm, inclusive of 1.2 nm and 2.8 nm. After the surface analysis, the glass sheet may be cut into the glass substrates in response to determining that the maximum value of the microwaviness is in the noted range. Further, a method of fabricating glass substrates from a glass sheet is described.

16 Claims, 11 Drawing Sheets

GLASS SHEET FOR FABRICATING MAGNETIC RECORDING MEDIA AND METHOD OF FABRICATING MAGNETIC RECORDING MEDIA

FIELD

The present disclosure relates to a glass sheet to be cut into glass substrates for magnetic recording disks and a method for fabrication of such glass substrates.

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high-definition television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the disk. When magnetic storage media uses a non-conductive substrate (such as a glass substrate and/or glass ceramic substrate), a conductive pre-seed layer may be deposited on the non-conductive substrate so that a bias voltage can be applied during the deposition of some or all of the subsequent media films to form the magnetic storage media. The pre-seed layer should have sufficient electrical conductance to facilitate the deposition processes.

A high-capacity magnetic storage device may include multiple recording disks, e.g., 8-12 disks, to increase total storage capacity of the magnetic storage device. To implement this number of disks in the limited space of the magnetic storage device, reducing thicknesses of the disks may be preferred. Further, since multiple disks are implemented per magnetic storage device, the demand for disk substrates may also increase. By utilizing a product such as a glass sheet that already exists for other applications for a cover glass, flat panel, etc., multiple disks may be produced in a cost-effective way. Hence, the non-conductive substrate may be a glass substrate made from a glass sheet. For example, the glass sheet may be cut into multiple glass substrates, and each glass substrate may be further fabricated to form a magnetic recording disk. In some aspects, the glass sheet may be manufactured using one of various glass manufacturing processes, such as a float process, a draw (or fusion) process, and a puck process. Depending on the condition of the glass sheet, various types and levels of processing may be required to process the glass substrate to make it suitable for forming the magnetic recording disk.

SUMMARY

In one aspect, a glass sheet configured to be cut into glass substrates for magnetic recording disks is provided. The glass sheet may include a first surface. For surface features of the first surface with a feature wavelength of 60 to 500 micrometers (μm), a root mean square of a surface topography of the surface features determined using a surface analysis on the first surface with incident and reflected light may be given as a microwaviness. A maximum value of the microwaviness of any arbitrary region of the first surface may be between 1.2 nanometers (nm) and 2.8 nm, inclusive of 1.2 nm and 2.8 nm.

In another aspect, a method of fabricating a plurality of glass substrates from a glass sheet to be used for magnetic recording disks is provided. The method may include providing the glass sheet having a first surface; performing a surface analysis on the first surface with incident light to generate displacement data based on the incident light and a reflection of the incident light, with a filter applied for a frequency range corresponding to a wavelength of 60 to 500 micrometers (μm), and to generate a root mean square of a shape of the first surface being given as a microwaviness based on the displacement data; determining that a maximum value of the microwaviness of any arbitrary region of the first surface is between 1.2 nanometers (nm) and 2.8 nm, inclusive of 1.2 nm and 2.8 nm; and cutting, in response to the determination, the glass sheet into the plurality of glass substrates.

In another aspect, a glass sheet configured to be cut into glass substrates for magnetic recording disks is provided. The glass sheet may include a first surface, the first surface comprising a predefined number of discrete first surface regions of equal size. For surface features of each of the first surface regions with a feature wavelength of 60 to 500 micrometers (μm), a root mean square of a surface topography of the surface features determined using a surface analysis on a respective one of the first surface regions with incident and reflected light is given as a microwaviness. A maximum value of the microwaviness of each of the first surface regions is between 1.2 nanometers (nm) and 2.8 nm, inclusive of 1.2 nm and 2.8 nm.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

Magnetic recording disks for magnetic storage devices may be manufactured by cutting glass substrates from a large glass sheet and fabricating the glass substrates into the magnetic recording disks. The glass sheet may have rough or non-uniform surfaces with defects that are processed to provide smooth surfaces for the magnetic recording disks. Therefore, processing costs and related efforts may depend on the original conditions of the glass sheet. According to some aspects of the disclosure, a glass sheet may be provided with a particular desired surface condition, where, for surface features of the first surface with a feature wavelength of 60 to 500 micrometers (μm), a root mean square of a surface topography of the surface features determined using a surface analysis on the first surface with incident and reflected light is given as a microwaviness, and a maximum value of the microwaviness of any arbitrary region of the first surface may be between 1.2 nanometers (nm) and 2.8 nm, inclusive of 1.2 nm and 2.8 nm. In some aspects, the feature wavelengths may indicate a thickness variation across the first surface. Further, according to some aspects of the disclosure, the surface analysis may be performed on the surface of the glass substrate and the glass sheet may be cut into the glass substrates in response to determining that a maximum value of the microwaviness of any arbitrary region of the surface is between 1.2 nm and 2.8 nm, inclusive of 1.2 nm and 2.8 nm. The resulting glass substrates may be processed to form magnetic recording media/disks, where such processing may involve less processing costs and related efforts than would be required for glass substrates not cut from a glass sheet meeting the desired surface condition.

Figure 1:
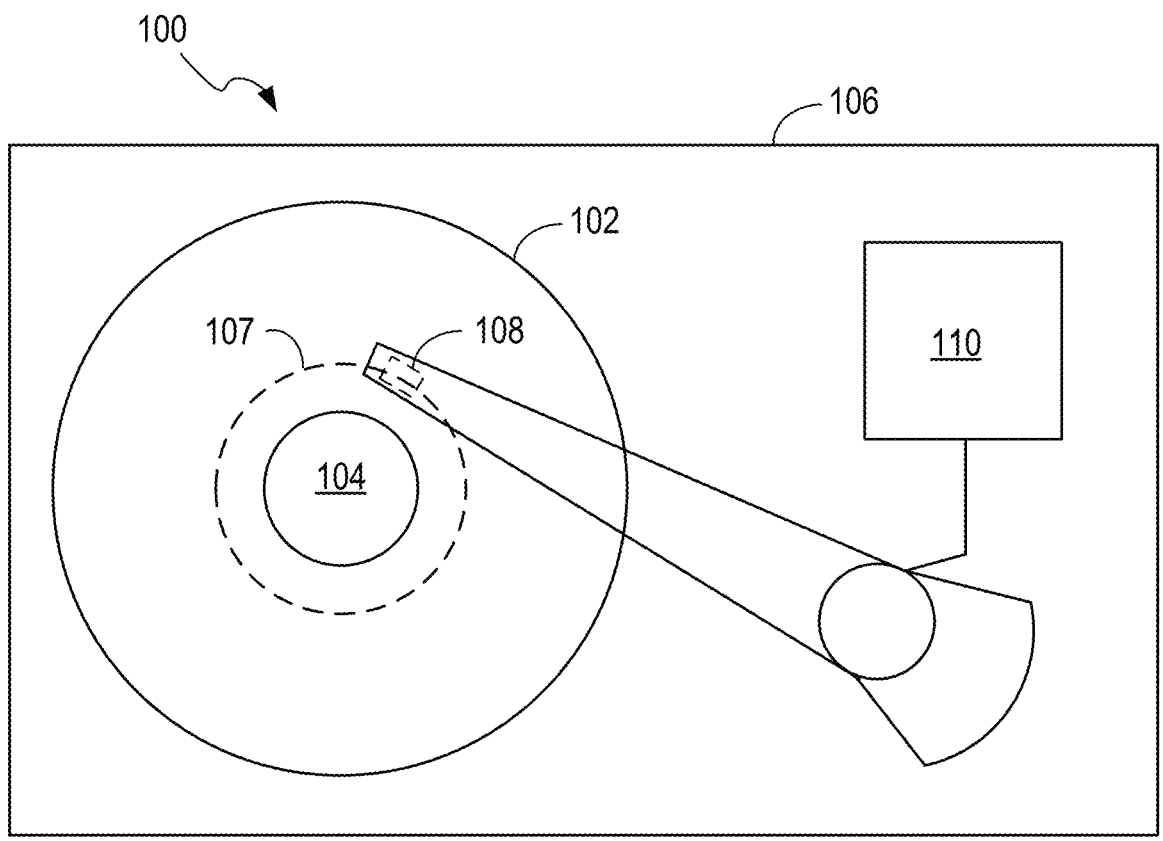
FIG. 1 illustrates a top plan view of a magnetic storage device including a disk shaped magnetic recording medium (magnetic recording disk) in accordance with an embodiment of the disclosure.

FIG. 1 is a top schematic view of a magnetic storage device 100 configured for magnetic recording and including a magnetic recording medium 102 having disks in accordance with some aspects of the disclosure. In illustrative examples, the magnetic recording medium 102 includes a perpendicular magnetic recording (PMR) medium. However, other recording media, such as heat assisted magnetic recording (HAMR) or microwave assisted magnetic recording (MAMR) media may be used in other examples. The magnetic storage device 100 may include one or more disks/media 102 to store data. Disk/media 102 resides on a spindle assembly 104 that is mounted to drive housing 106. Data may be stored along tracks 107 in the magnetic recording layer of disk 102. The reading and writing of data are accomplished with the head/slider 108 that may have both read and write elements. The write element is used to alter the properties of the magnetic recording layer of disk 102 and thereby write information thereto. In one embodiment, recording head 108 may have magneto-resistive (MR), or giant magneto-resistive (GMR) elements, such as tunnel magneto-resistive (TMR) elements for reading, and a write pole with coils that can be energized for writing. In another embodiment, head 108 may be another type of head, for example, an inductive read/write head or a Hall effect head. In operation, a spindle motor (not shown) rotates the spindle assembly 104, and thereby rotates disk 102 to position head 108 at a particular location along a desired disk track 107. The position of the head 108 relative to the disk 102 may be controlled by position control circuitry 110.

Figure 2:
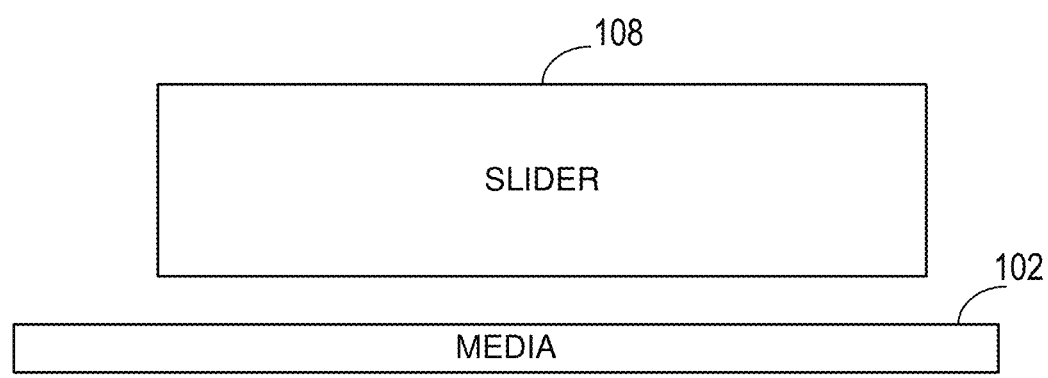
FIG. 2 illustrates a profile view of a slider and a magnetic recording medium in accordance with an embodiment of the disclosure.

FIG. 2 is a side cross sectional schematic view of selected components of the magnetic recording system of FIG. 1 including the magnetic recording medium 102 with disk in accordance with aspects of the disclosure. The head/slider 108 is positioned above the medium 102. The head/slider 108 includes a write element and a read element (not shown) positioned along an air bearing surface (ABS) of the slider (e.g., bottom surface) for writing information to, and reading information from, respectively, the medium 102. FIGS. 1 and 2 illustrate a specific example of a magnetic recording system. In other examples, embodiments of the improved media can be used in other suitable magnetic recording systems (e.g., such as HAMR, and MAMR recording systems). For simplicity of description the various embodiments are primarily described in the context of an exemplary HDD magnetic recording system.

Figure 3:
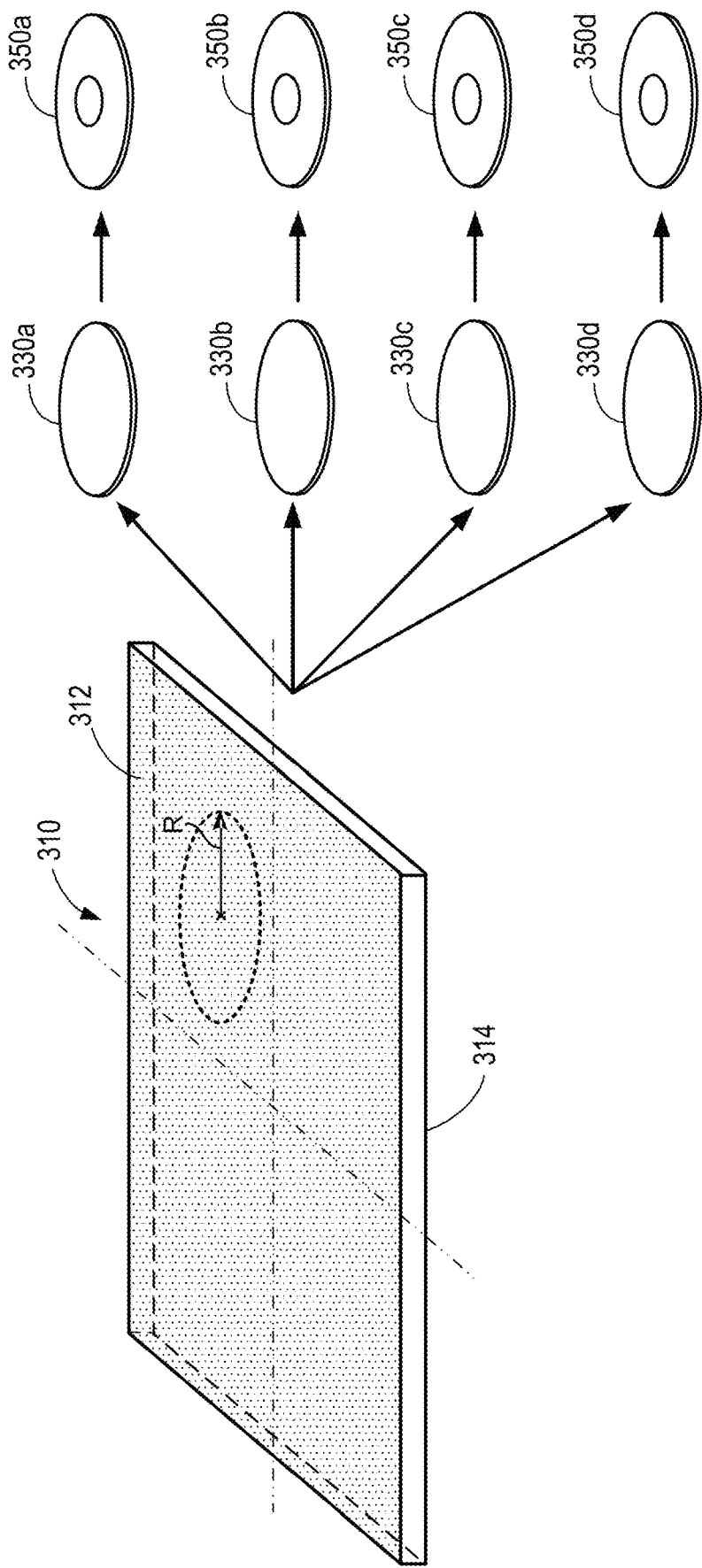
FIG. 3 is an example diagram illustrating production of glass substrates from a glass sheet that are configured to be further processed to form magnetic recording disks in accordance with some aspects of the disclosure.

FIG. 3 is an example diagram illustrating production of glass substrates from a glass sheet that are configured to be further processed to form magnetic recording disks in accordance with some aspects of the disclosure. To manufacture a magnetic recording disk such as the disk 102 of FIG. 1, a glass sheet may be cut into multiple glass substrates, and the glass substrates may be further processed to form magnetic recording disks. As shown in FIG. 3, for example, a glass sheet 310 with a first surface 312 and a second surface 314 are cut into glass substrates 330*a*, 330*b*, 330*c*, and 330*d*, which are processed to form magnetic recording disks 350*a*, 350*b*, 350*c*, and 350*d* (e.g., after undergoing further cutting and various deposition steps). In this process, the top and the bottom surfaces of the glass sheet 310 become the top and bottom surfaces of the glass substrates 330*a*, 330*b*, 330*c*, and 330*d*. In some examples, the glass sheet may be divided into multiple regions from which multiple glass substrates for magnetic recording disks are cut. In the example illustrated in FIG. 3, the glass sheet 310 is divided into four regions, and the glass substrates 330*a*, 330*b*, 330*c*, and 330*d* are cut from the four regions, respectively. In other examples, the glass sheet may be divided into less than or greater than four regions.

A glass sheet is generally an unfinished sheet of glass that may have foreign substances, defects, and/or roughness.

Glass substrates for the magnetic recording disks generally require a smooth surface with few or no defects. Therefore, after cutting the glass sheet into glass substrates, multiple polishing steps and/or a lapping process may be applied to the glass substrate to achieve the desired smoothness in the surface and/or to adjust a thickness of the glass substrate. Such steps and processes may be a significant part of a production cost for the magnetic recording disks. These polishing steps, the lapping process, and/or other processing steps may be minimized or eliminated if a glass sheet that satisfies, at least to some degree, a condition (e.g., a measurement of a characteristic of the glass sheet) for the glass substrates to be made into the magnetic recording disks. In some aspects, the magnetic recording disks may have a recording density of more than 1 Tb/in$^2$.

For these reasons, a condition of the glass sheet, especially the quality of surfaces of the glass sheet, may be very important. For example, characteristics such as thickness, waviness, and/or roughness of the glass sheet surfaces may be measured to provide a glass sheet that requires reduced processing steps to form the magnetic recording disks. The waviness may be used to quantify a surface condition of a raw glass sheet. In some aspects, the waviness of a surface may be defined based on a surface analysis on a glass sheet surface with an incident light. In an aspect, for surface features of a glass sheet surface with a feature wavelength of 60 to 500 micrometers (μm), a root mean square of a surface topography of the surface features determined using the surface analysis on the glass sheet surface with incident and reflected light may be given as a microwaviness. In one example, the surface analysis may generate velocity data based on the incident light and a reflection of the incident light, filter the velocity data for a frequency range corresponding to the wavelength of 60 to 500 μm and then may generate displacement data based on the filtered velocity data, such that the displacement data includes data for a frequency range corresponding to the wavelength of 60 to 500 μm. In this example, a filter may be applied to the velocity data obtained using the laser Doppler vibrometer, to obtain the displacement data within the frequency range corresponding to the wavelength of 60 to 500 μm based on the filtered velocity data. In another example, the surface analysis may generate velocity data based on the incident light and a reflection of the incident light, generate displacement data based on the velocity data, and then filter the displacement data within the frequency range corresponding to the wavelength of 60 to 500 μm. In this example, a filter may be applied to the displacement data generated based on the velocity data, to obtain the displacement data within a frequency range corresponding to the wavelength of 60 to 500 μm.

In some aspects, the wavelength of 60 to 500 μm may correspond to a resonance frequency that matches how fast the magnetic recording disk spins in a disk drive (e.g., in revolutions per minute (RPMs)). In some aspects, a range of the feature wavelength may be based on a size of a laser utilized by the laser Doppler vibrometer and a length of a slider (e.g., slider 108) for reading a magnetic recording disk. If a feature on a glass sheet surface is greater than the length of the slider, a reading error on this feature is less likely than for a feature on a glass sheet surface that is less than or equal to the length of the slider. Further, if a feature on a glass sheet surface is smaller than a diameter of the laser, then a reading error on this feature is less likely than for a feature on a glass sheet surface that is greater than or equal to the diameter of the laser. Hence, for example, a lower bound of the range of the feature wavelength may correspond to a diameter of the laser used in the laser Doppler vibrometer and an upper bound of the range of the feature wavelength may correspond to a length of the slider for reading a magnetic recording disk. Hence, in one example, if the diameter of the laser is 60 m and the length of the slider is 500 μm, the range of the feature wavelength may be 60 to 500 μm.

A frequency range that corresponds to a range of the feature wavelength may be calculated based on the following equations.

$$\text{Linear velocity}=2\times\pi\times R\times\text{angular velocity}/60 \quad\quad \text{Equation (1)}$$

$$\text{Frequency}=\text{Linear velocity}/\text{Wavelength} \quad\quad \text{Equation (2)}$$

In Equation (1), R represents a test radius with respect to a portion on a disk substrate where the laser from the laser Doppler vibrometer is used during the surface analysis and the angular velocity represents how fast the disk substrate spins during the surface analysis. In one example, if the angular velocity is 5050 millimeter (mm) per second (mm/sec) and R is 47.5 mm, then the linear velocity is approximately 25120 mm/sec. The frequency that corresponds to the wavelength of 60 μm is 25120 mm/sec/0.06 mm=418.67 kHz. The frequency that corresponds to the wavelength of 500 μm is 25120 mm/sec/0.5 mm=50.24 kHz. Hence, the frequency range that corresponds to the feature wavelength of 60 to 500 μm is 50.24 kHz to 418.67 kHz.

Figure 4:
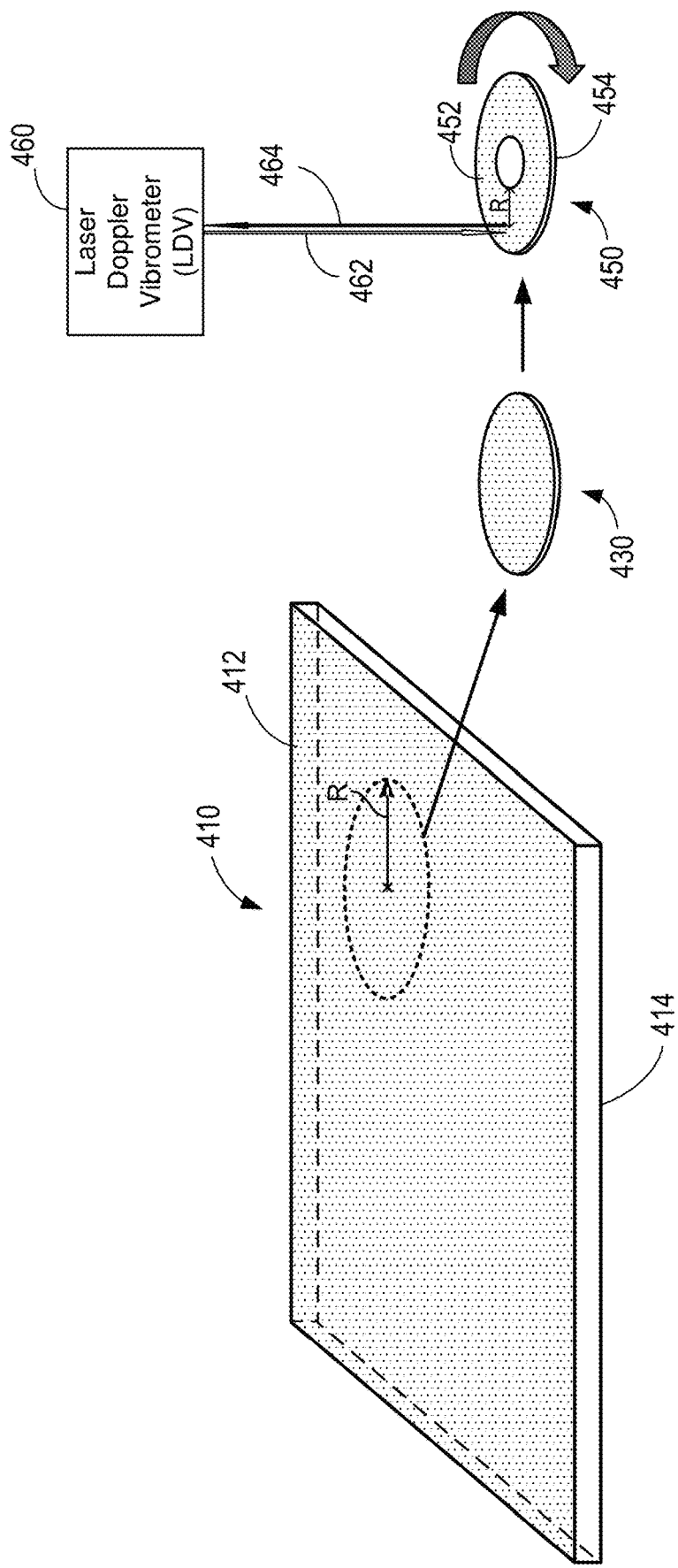
FIG. 4 is an example diagram illustrating measurement of a waviness of a glass sheet using a laser Doppler vibrometer, in accordance with some aspects of the disclosure.

FIG. 4 is an example diagram illustrating measurement of a waviness of a glass sheet using a laser Doppler vibrometer, in accordance with some aspects of the disclosure. Because a glass sheet generally has imperfections, surfaces of the glass sheet may not be perfectly flat or smooth, and thus a waviness may be measured to estimate how flat/smooth or "wavy" a surface of the glass sheet is. In order to measure the waviness of a first surface 412 of a glass sheet 410, a laser Doppler vibrometer 460 with an incident light 462 may be used to perform a surface analysis of the first surface 412. For example, as shown in FIG. 4, a small portion such as a glass substrate 430 may be cut from the glass sheet 410 and made into a disk 450, so that the disk 450 may be easily placed onto a rotating spindle for the purpose of measurements by the laser Doppler vibrometer 460. In some aspects, the laser Doppler vibrometer 460 utilizes a laser to provide the incident light 462. For example, the laser may be a helium-neon laser having a fixed wavelength (e.g., 632.8 nm) and modulated at a particular frequency (e.g., 20 MHz). The waviness can be measured as an average root mean square (RMS) at certain radial locations of the first surface 452 of the disk 450 or as an average RMS of the entire first surface 452. In an example, it may be assumed that the waviness of the first surface 452 of the disk 450 represents the waviness of the first surface 412 of a glass sheet 410.

The laser Doppler vibrometer 460 measures a frequency shift (e.g., Doppler shift) between the incident light 462 directed on a first surface 452 and a light reflection reflected off the first surface 452 due to topographical height variations on a surface and converts the frequency shift into a velocity value. For example, the laser Doppler vibrometer 460 may measure a frequency shift between the incident light 462 and the reflected light 464 that is reflected from a portion (e.g., at test radius R) of the surface of a first surface 452 of the disk 450. In some aspects, based on the velocity values obtained using the laser Doppler vibrometer 460, the waviness can be measured as average RMS (Rq) at certain radial locations or an average of the entire surface with the laser doppler vibrometer. In some aspects, although not shown in FIG. 4, the laser Doppler vibrometer 460 with an incident light 462 may also be used to perform a surface analysis on a second surface 414 of the glass sheet 410. In the orientation shown in FIG. 4, the first surface 412 may be a top surface and the second surface 414 may be a bottom surface of the glass sheet 410, and the first surface 452 may be a top surface of the disk 450 and the second surface 454 may be a bottom surface of the disk 450, though these top and bottom designations are arbitrary.

Figure 5A:
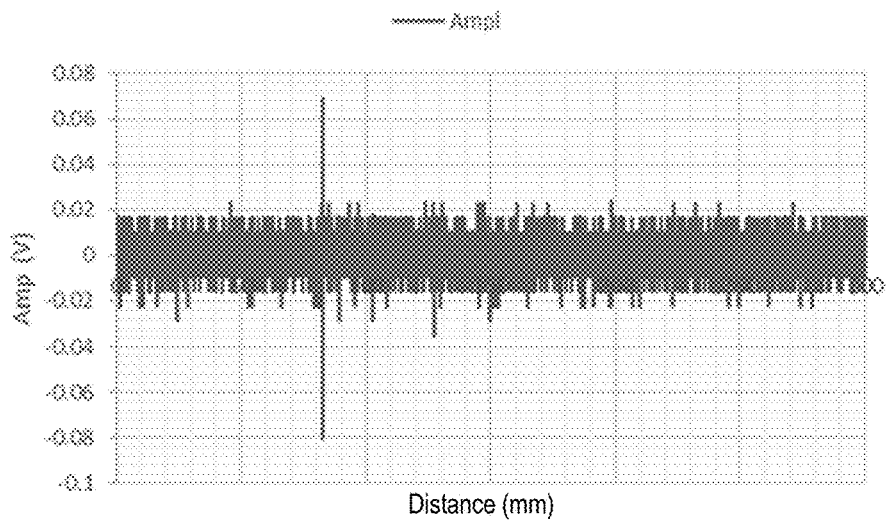
FIGS. 5A, 5B, and 5C are example diagrams illustrating conversion of velocity data from a laser Doppler vibrometer into surface topography values and calculation of root mean square values (RMS) values of the surface topography values, in accordance with some aspects.
Figure 5B:
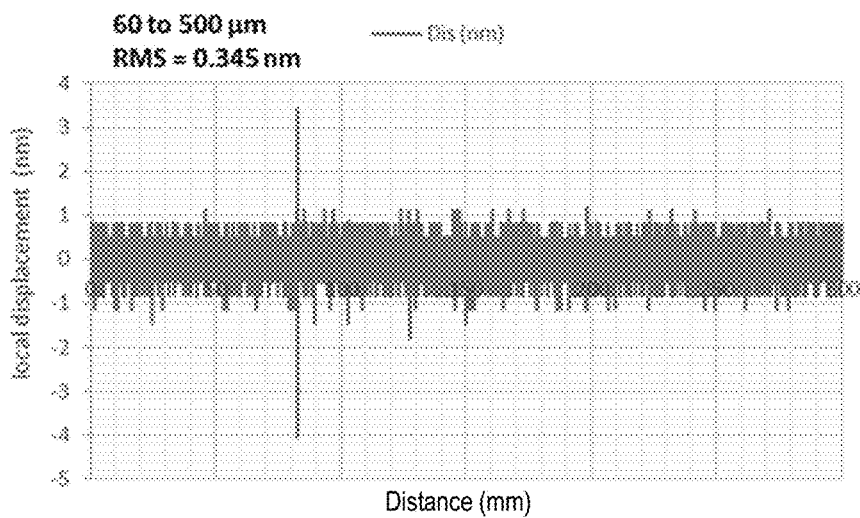
Figure 5C:
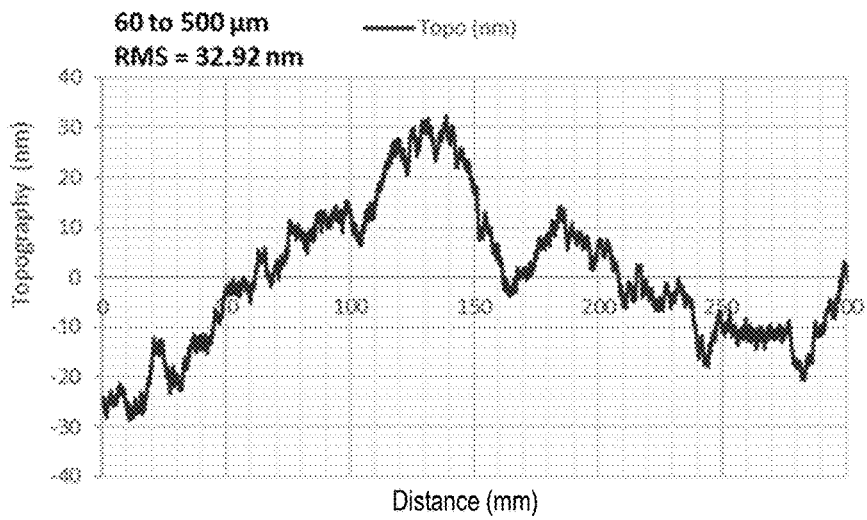

FIGS. 5A, 5B, and 5C are example diagrams illustrating conversion of velocity data from a laser Doppler vibrometer into surface topography values and calculation of RMS values of the surface topography values, in accordance with some aspects. FIG. 5A is an example diagram illustrating a velocity signal in one revolution, as obtained by the laser Doppler vibrometer. For example, a radius where the laser Doppler vibrometer measurements are made may be 47.5 mm and a glass sheet disk (e.g., disk 450 of FIG. 4) may be rotated at 5050 revolutions per minute, while the laser Doppler vibrometer makes measurements on a surface of the glass sheet disk. In particular, FIG. 5A is a plot showing velocity values over distance on the surface of the glass sheet disk in one revolution, after a filter is applied to provide velocity values within a frequency range corresponding to the wavelength of 60 to 500 micrometers. As explained above, in an example, the filter may have the frequency range of 50.24 kHz to 418.67 kHz.

FIG. 5B is an example diagram illustrating displacement data based on the velocity data of FIG. 5A, in accordance with some aspects. In particular, FIG. 5B illustrates a plot of displacement data over distance on the surface of the glass sheet disk, which is generated by calculating values of slope (derivatives) from the velocity data of FIG. 5B. The displacement data of FIG. 5B may have an RMS value of 0.345 nm. For example, the displacement values of FIG. 5B may be calculated based on the following equation (where a sensitivity of the laser Doppler vibrometer may be 50 millimeter/second/volt, for example):

$$\text{Velocity} \times \text{Sensitivity} \times \Delta t. \qquad \text{Equation (3)}$$

FIG. 5C is an example diagram illustrating integrated surface topography data based on the velocity data of FIG. 5A, according to some aspects. In particular, FIG. 5C illustrates a plot showing integrated surface topography values over distance on the surface of the glass sheet disk in one revolution, which is generated by calculating the integral values of the velocity data of FIG. 5A. The integrated surface topography values of FIG. 5C may represent a shape of a surface of the glass sheet in one revolution. The integrated surface topography data of FIG. 5C may have an RMS value of 32.92 nm. For example, the integrated surface topography values of FIG. 5C may be calculated based on the following equation (where the sensitivity of the laser Doppler vibrometer may be 50 millimeter/second/volt, for example):

$$\Sigma \text{Velocity} \times \text{Sensitivity} \times \Delta t. \qquad \text{Equation (4)}$$

Figure 6A:
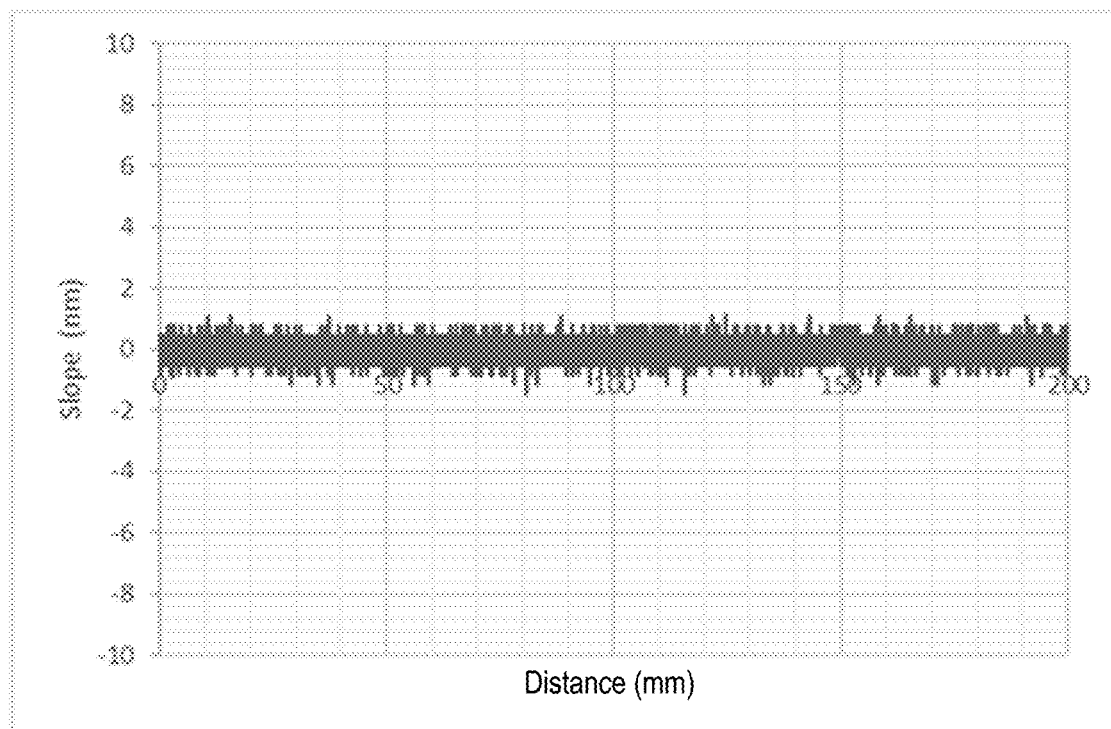
FIGS. 6A and 6B are example diagrams illustrating conversion of velocity data from a laser Doppler vibrometer into surface height values and calculation of root mean square (RMS) values of the surface height values, in accordance with some aspects of the disclosure.
Figure 6B:
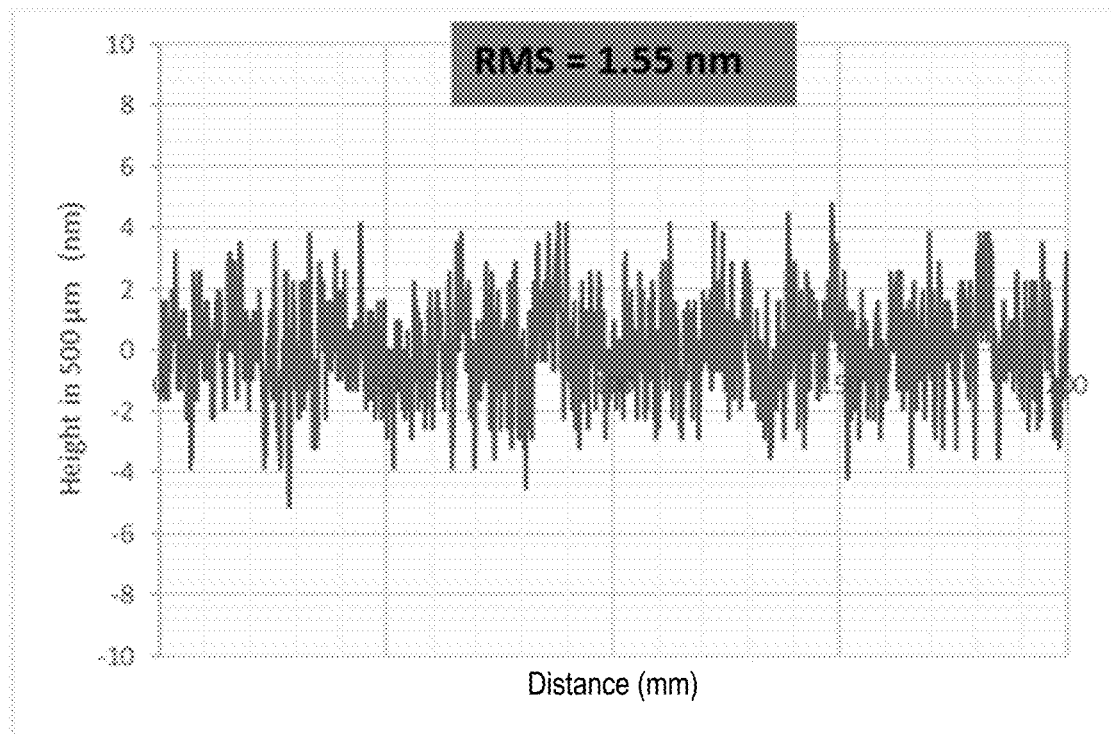

FIGS. 6A and 6B are example diagrams illustrating conversion of velocity data from a laser Doppler vibrometer into surface height values and calculation of RMS values of the surface height values, in accordance with some aspects of the disclosure. FIG. 6A is an example diagram illustrating a graph of the values of slopes (of velocity values) versus distance on a surface of the glass sheet disk, where the velocity values were obtained by the laser Doppler vibrometer and were filtered to provide velocity values within a frequency range corresponding to the wavelength of 60 to 500 micrometers.

FIG. 6B is an example diagram illustrating a graph of surface height values versus distance on the surface of the glass sheet disk. By calculating integrals of the slopes of the velocity values shown in FIG. 6A within 500 µm, surface height values are calculated over distance (e.g., within 500 µm in the circumferential direction). Subsequently, an RMS value may be calculated based on the surface height values.

When analyzed by a surface analysis on a first surface of a glass sheet (e.g., the glass sheet 310, 410) with incident light (e.g., using the laser Doppler vibrometer), the surface analysis generates an RMS of a shape of the first surface that may be given as a microwaviness. For example, a very small microwaviness value for the first surface may indicate that the first surface is close to being flat, while a large microwaviness value may indicate that the first surface is very wavy and/or rough. Thus, a smaller microwaviness is a preferred characteristic for a surface of a glass sheet to be cut into glass substrates for magnetic recording disks.

In some aspects, the surface analysis may be performed based on the example described in reference to FIGS. 6A and 6B. For example, the RMS may be generated based on velocity values within a frequency range corresponding to the wavelength of 60 to 500 micrometers that are obtained using measurements on the first surface by the laser Doppler vibrometer with the incident light on the first surface. According to some aspects, when analyzed by the surface analysis on the first surface of the glass sheet with incident light, a maximum value of the microwaviness of any arbitrary region of the first surface may be between 1.2 nm and 2.8 nm, inclusive of 1.2 nm and 2.8 nm. The range 1.2 nm and 2.8 nm may provide the optimal surface that reduces processing costs of the glass substrates. For example, referring to FIG. 4, when analyzed by the surface analysis on the first surface 452 with the incident light, a maximum value of the microwaviness of any arbitrary region of the first surface 452 may be between 1.2 nm and 2.8 nm, inclusive of 1.2 nm and 2.8 nm. In some aspects, the glass sheet may be made of unpolished glass configured to be cut into the glass substrates for the magnetic recording disks. In some aspects, when cut into glass substrates for magnetic recording disks, the first surface may be made into a recording surface where data is magnetically recorded. Hence, for example, referring to FIG. 4, when the glass sheet 410 is fabricated into magnetic recording disks, the first surface 452 may be used for data recording. In some aspects, the maximum value of the microwaviness of any arbitrary region of the first surface may be between 1.2 nm and 2.5 nm, inclusive of 1.2 nm and 2.5 nm. For example, if a thickness of the unpolished glass sheet is similar to a thickness of a glass substrate made from the unpolished glass sheet, a costly lapping process may be skipped as long as the maximum value of the microwaviness of any arbitrary region of the first surface may be between 1.2 nm and 2.5 nm, inclusive of 1.2 nm and 2.5 nm.

In some aspects, the glass sheet may have a cuboid shape having six surfaces including the first surface. For example, as shown in FIG. 4, the glass sheet 410 has a cuboid shape having six surfaces. The glass sheet 410 has a large first surface 412 and a large bottom surface 414 substantially parallel to the first surface 412, where the large first surface 412 may be the first surface. The glass sheet 410 also has four other surfaces on the sides between the first surface 412 and the second surface 414.

In some aspects, where the glass sheet has a substantially cuboid shape, as analyzed by an additional surface analysis on at least one surface of the six surfaces that is different from the first surface with the incident light, the additional surface analysis generating a root mean square of a shape of the at least one surface may be given as a microwaviness. In this aspect, a maximum value of the microwaviness of any arbitrary region of the at least one surface may be between 1.2 nm and 2.8 nm, inclusive of 1.2 nm and 2.8 nm. For example, the RMS may be generated based on velocity values measured on the at least one surface by the laser Doppler vibrometer using the incident light, using the similar approaches described in reference to FIGS. 6A and 6B. For example, referring to FIG. 4, the microwaviness of any arbitrary region of the second surface 414 may be between 1.2 nm and 2.8 nm, inclusive of 1.2 nm and 2.8 nm. In this example, according to some aspects, when the glass sheet 410 is fabricated into magnetic recording disks, both the first surface 412 and the second surface 414 may be used for data recording. In some aspects, the maximum value of the microwaviness of any arbitrary region of the at least one surface may be between 1.2 nm and 2.5 nm, inclusive of 1.2 nm and 2.5 nm.

In some aspects, the maximum value of the microwaviness of any arbitrary region of the at least one surface may be between 0.7 nm and 1.2 nm, inclusive of 0.7 nm and 1.2 nm. For example, in this aspect, the at least one surface may be at least somewhat polished.

In some aspects, a microwaviness of raw unpolished glass sheet should be less than 7 times of the microwaviness of glass substrates after polishing. By minimizing the microwaviness of the glass sheet, polishing efforts and cost may be reduced when glass substrates are cut from the glass sheet and polished. Further, a starting thickness of the glass sheet may also be important to minimize manufacturing costs. In one aspect, to avoid costly lapping process(es), the target starting thickness of the glass sheet may be at most 50 μm greater than a thickness of a glass substrate, cut therefrom, after it was cut and polished.

In some aspects, a thickness of the glass sheet is a distance between the first surface and a second surface of the glass sheet, the second surface being substantially parallel to the first surface. For example, referring to FIG. 4, a thickness of the glass sheet 410 may be a distance between the first surface 412 and the second surface 414 that is substantially parallel to the first surface 412. In some aspects, the thickness of the glass sheet is in a range of at least one of the following ranges: 0.6-0.65 millimeters (mm), 0.5-0.55 mm, 0.4-0.45 mm, 0.41-0.46 mm, 0.38-0.43 mm, or 0.3-0.35 mm. For example, where a glass substrate is made from a glass sheet, a desired thickness of the glass sheet may be between a thickness of the glass substrate −25 μm and the thickness of the glass substrate+25 μm.

According to some aspects, the first surface of the glass sheet may include a predefined number of discrete first surface regions of equal size. In this aspect, for surface features of each of the first surface regions with a feature wavelength of 60 to 500 μm, a root mean square of a surface topography of the surface features determined using a surface analysis on a respective one of the first surface regions with incident and reflected light is given as a microwaviness, where a maximum value of the microwaviness of each of the first surface regions is between 1.2 nanometers (nm) and 2.8 nm, inclusive of 1.2 nm and 2.8 nm. In some aspects, the number of the discrete first surface regions may be defined based on a dimension of the first surface of the glass sheet and a dimension of magnetic recording disks to be made from the glass sheet. For example, if a dimension of the first surface of the glass sheet is A×B mm and the outer diameter of a desired magnetic recording disk is D mm, where A, B, and D are integers, a maximum number of the multiple first surface regions may be defined as ceiling(A/D)×ceiling (B/D), where ceiling(A/D) is an integer rounded up from A/D and ceiling (B/D) is an integer rounded up from B/D. The predefined number of the multiple first surface regions may be less than or equal to this maximum number.

In some aspects, at least one of the first surface regions of the first surface may include a disk region to be cut into a disk for a magnetic recording disk. In this aspect, for disk region surface features of the disk region with a feature wavelength of 60 to 500 μm, a root mean square of a surface topography of the disk region surface features determined using a surface analysis on the disk region with incident and reflected light may be given as a microwaviness of the disk region, where a maximum value of the microwaviness of the disk region is between 1.2 nanometers (nm) and 2.8 nm, inclusive of 1.2 nm and 2.8 nm.

In an example, referring back to FIG. 3, the first surface 312 may include 4 discrete first surface regions of equal size, and the glass substrates 330a, 330b, 330c, and 330d for the magnetic recording disks glass substrates 350a, 350b, 350c, and 350d may be cut from the 4 first surface regions, respectively, and the surface analysis may be performed on each of the 4 first surface regions, where a maximum value of the microwaviness of each of the 4 first surface regions is between 1.2 nm and 2.8 nm, inclusive of 1.2 nm and 2.8 nm. In other examples, more than or less than 4 surface regions may be used.

Because surfaces of a glass sheet may not be completely smooth or flat, a thickness of the glass sheet may vary across different portions of the glass sheet. To provide a substantially flat surface of a glass substrate, a difference in thickness between two arbitrary points of the glass sheet may be designed to be small. Hence, in some aspects, a thickness variation measurement of the glass sheet, as defined by a thickness difference of any two arbitrary points on the first surface, may be equal to or less than 2 μm. In some aspects, the two arbitrary points on the first surface may be selected so that a distance between the any two arbitrary points may be greater than or equal to a distance between an inner diameter and an outer diameter of the magnetic recording disk to be made from the glass sheet. In some aspects, the two arbitrary points may be at least 45 mm apart.

Figure 7:
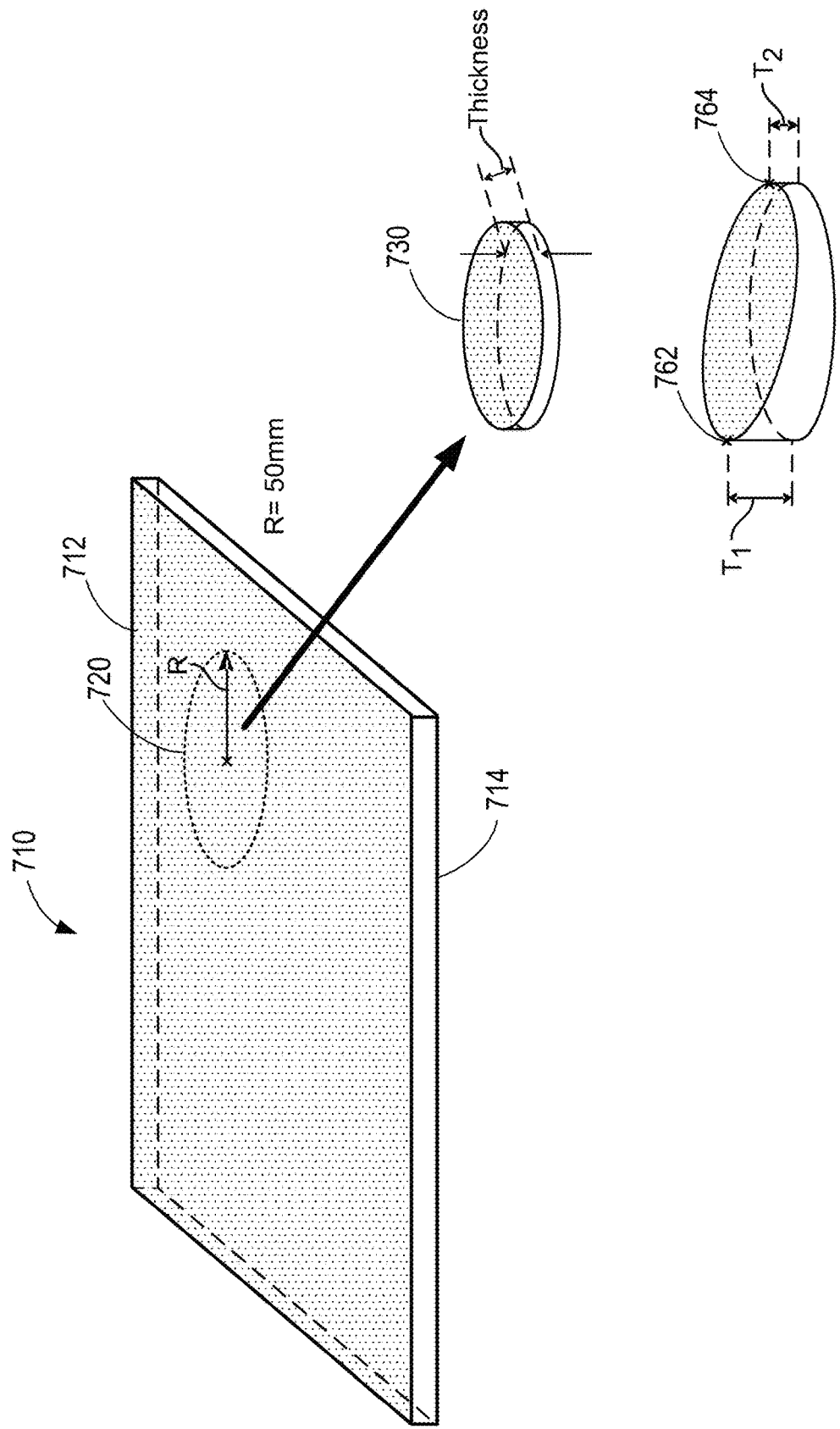
FIG. 7 is an example diagram illustrating a thickness variation determination based on a height difference, in accordance with some aspects of the disclosure.

FIG. 7 is an example diagram illustrating a thickness variation determination based on a height difference, in accordance with some aspects of the disclosure. As discussed above, a glass sheet 710 may be cut into one or more glass substrates for magnetic recording disks. For example, a portion 720 of the glass sheet 710 may be cut into a glass substrate 730 having a radius R. Because glass sheet 710 is not completely smooth or flat, the thickness may vary across different portions of the glass sheet 710, where the thickness may be a distance between the first surface 712 and a second surface 714 of the glass sheet 710. In the orientation shown in FIG. 7, the first surface 712 may be a top surface and the second surface 714 may be a bottom surface of the glass sheet 710. Two arbitrary points, a first arbitrary point 762 and a second arbitrary point 764 on the first surface 712, may be selected randomly on the first surface 712. Then, a thickness difference between a thickness $T_1$ of the first arbitrary point 762 and a thickness $T_2$ of the second arbitrary point 764 may be determined, and in one example, determined to be less than 2 μm.

In some aspects, a flatness on the first surface of the glass sheet may be defined as a distance between a first reference plane defined by three first points of the first surface farthest from a center plane and a deepest point of the first surface closest to the center plane, where the center plane is located between the first surface and the second surface and is substantially parallel to the first surface. For example, the flatness within a certain radius from any arbitrary point on the first surface may be small, such that the first surface may be substantially flat. In some aspects, the flatness within a radius of 50 millimeters (mm) from any arbitrary point on the first surface or the second surface of the glass sheet may be less than 8 μm.

Figure 8:
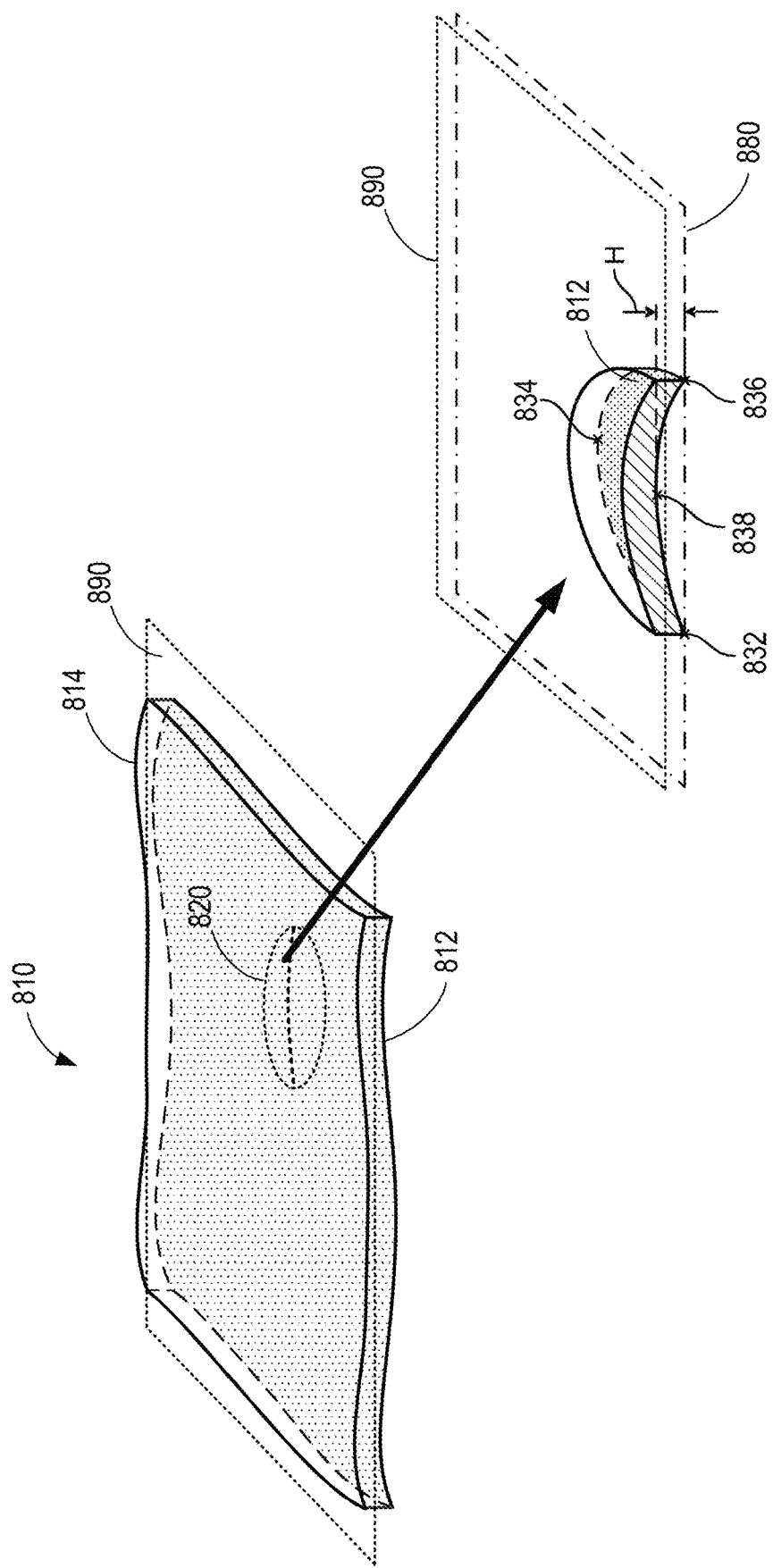
FIG. 8 is an example diagram illustrating a flatness determination based on a reference plane defined by three points of a surface of a glass sheet, in accordance with some aspects of the disclosure.

FIG. 8 is an example diagram illustrating a flatness determination based on a reference plane defined by three points of a surface of a glass sheet, in accordance with some aspects of the disclosure. As shown in FIG. 8, a glass sheet 810 has a first surface 812 on which the surface analysis discussed above may be performed. The glass sheet 810 may also have a second surface 814 that is substantially parallel to the first surface 812. In the orientation shown in FIG. 8, the first surface 812 may be a bottom surface and the second surface 814 may be a top surface of the glass sheet 810. For the purpose of illustration, a circular portion 820 with a certain radius may be examined from the glass sheet 810. The circular portion 820 has three first points 832, 834, and 836 that are on the first surface 812 and farthest from a center plane 890 within the portion 820, where the center plane 890 is located between the first surface 812 and the second surface 814 and is substantially parallel to the first surface 812. A first reference plane 880 may be defined by the three first points 832, 834, and 836 of the first surface 812 that are farthest from the center plane 890. A flatness H on a first surface 812 of a glass sheet 810 (e.g., within the portion 820) may be defined as a distance between the first reference plane 880 and a deepest point 838 of the first surface 812 within the portion 820, where the deepest point 838 is a point on the first surface 812 closest to the center plane 890. The flatness within a certain radius (e.g., radius of 50 mm) from any arbitrary point on the first surface 812 may be less than 8 μm.

Figure 9:
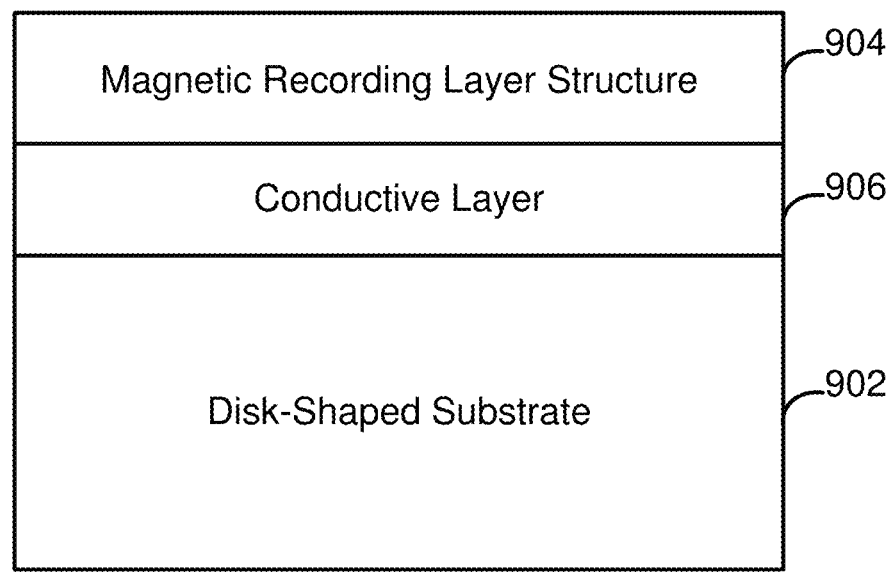
FIG. 9 illustrates, in simplified form, an exemplary magnetic recording disk having a conductive layer formed on a glass substrate.

FIG. 9 illustrates, in simplified form, an exemplary magnetic recording disk 900 having a conductive layer 906 formed on a glass substrate 902. A magnetic recording layer structure 904 is deposited on one side (e.g., the top side) of the glass substrate 902 above the conductive coating/layer (e.g., plating) layer 906. As discussed above, the conductive layer, which may also function as adhesion layer, is provided on the substrate to enable subsequent deposition of another layer using bias voltage and sputter deposition. In some examples, a magnetic recording layer structure is deposited on only one side of the substrate and hence only one conductive layer/coating is provided. The magnetic recording layer (e.g., 904) may include, e.g., cobalt-platinum (CoPt), iron-platinum (FePt) alloy, and/or combinations thereof. For clarity and simplicity, FIG. 9 only shows a few of the layers typically included in a magnetic recording medium. Further details of an exemplary media structure may be found in U.S. patent application Ser. No. 17/361,272, entitled "HEAT ASSISTED MAGNETIC RECORDING MEDIA WITH AMORPHOUS MAGNETIC GRAIN BOUNDARY MATERIAL," filed on Jun. 28, 2021, and assigned to the assignee of the present application, and which is incorporated fully by reference herein.

Although not shown in FIG. 9, the magnetic recording layer structure 904 may include magnetic recording sub-layers and exchange control sub-layers (ECLs). Collectively, the sub-layers form a magnetic recording layer structure 904 that may be, e.g., 100-200 angstroms (Å) thick. Since both the conductive layers and the magnetic recording layer structure are both very thin (e.g., on the order of microns (μm) or Å, respectively), the thickness of the disk 900 is primarily dictated by the thickness of the substrate, e.g., 0.5 mm or less (and, e.g., in the range of 0.2 mm to 0.5 mm). Note that other coatings may be provided as well, which are also very thin and do not significantly add thickness. For example, protective layers may be deposited that include carbon, diamond-like crystal, carbon with hydrogen and/or nitrogen doping, and/or combinations thereof.

In some examples, the glass substrate 902 has a diameter (i.e., OD) of about 95 mm or larger (e.g., 97 mm), a thickness of 0.5 mm or less. In other examples, the OD may be 98 mm or 98.1 mm. (Generally speaking, such disks are all referred to as "3.5 inch" disks.) The glass substrate 902 may be made of non-conductive materials such as glass, glass ceramic, aluminum, magnesium, zinc, and/or combinations thereof.

Figure 10:
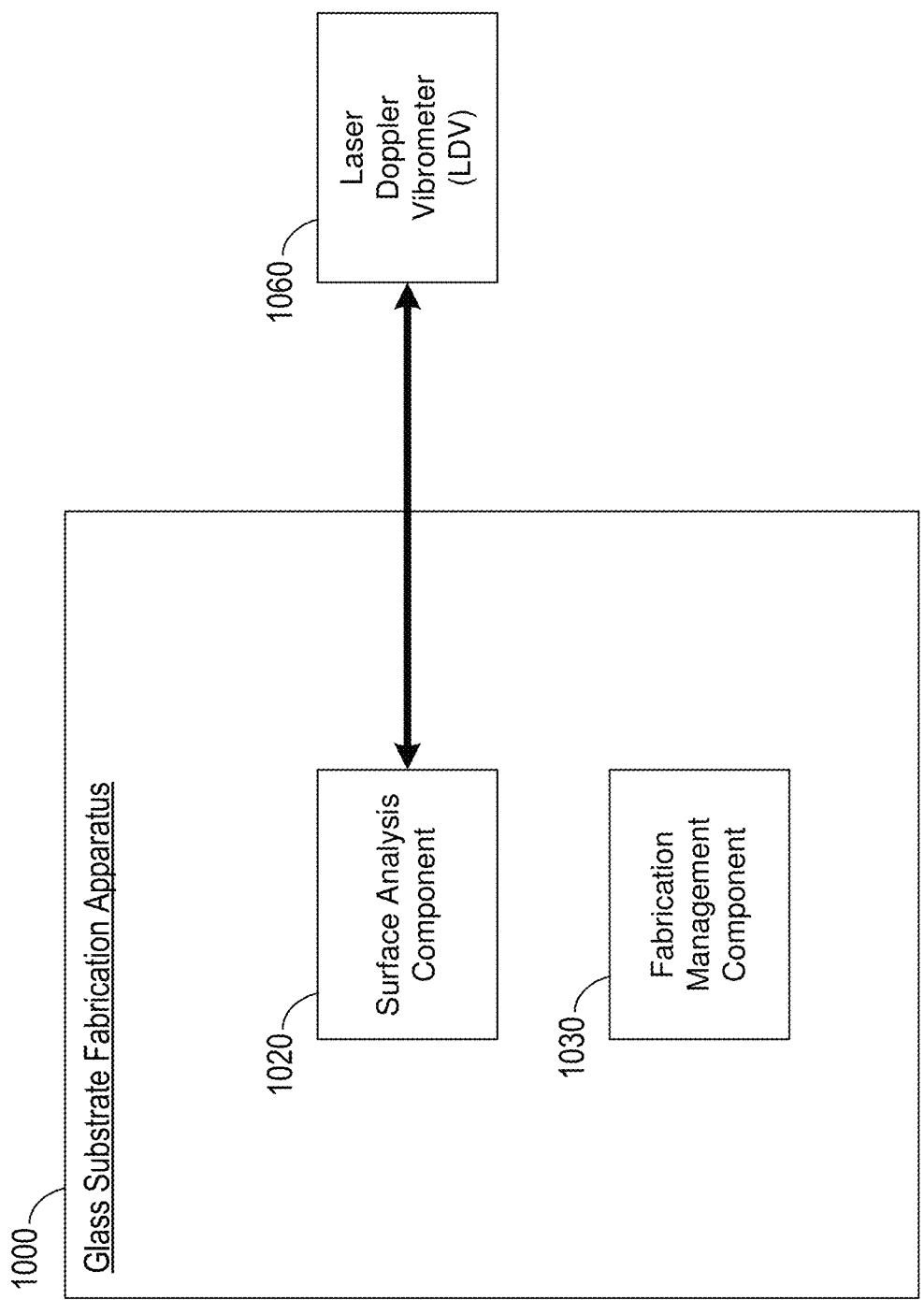
FIG. 10 illustrates an exemplary block diagram for a glass substrate fabrication apparatus 1000 in accordance with aspects of the disclosure.

FIG. 10 illustrates an exemplary block diagram for a glass substrate fabrication apparatus 1000 in accordance with aspects of the disclosure. The glass substrate fabrication apparatus 1000 may include a surface analysis component 1020 configured to provide a glass sheet having a first surface and to perform a surface analysis on the first surface with incident light to generate displacement data based on the incident light and a reflection of the incident light, with a filter applied for a frequency range corresponding to a feature wavelength of 60 to 500 micrometers (μm), and to generate a root mean square of a shape of the first surface being given as a microwaviness based on the displacement data. In some aspects, the surface analysis may be performed using a laser Doppler vibrometer 1060, which may reside outside the glass substrate fabrication apparatus 1000 or may reside within the glass substrate fabrication apparatus 1000. The surface analysis component 1020 may be further configured to determine that a maximum value of the microwaviness of any arbitrary region of the first surface is between 1.2 nanometers (nm) and 2.8 nm, inclusive of 1.2 nm and 2.8 nm. The glass substrate fabrication apparatus 1000 may further include a fabrication management component 1030 configured to cut, in response to the determination, the glass sheet into the plurality of glass substrates.

Figure 11:
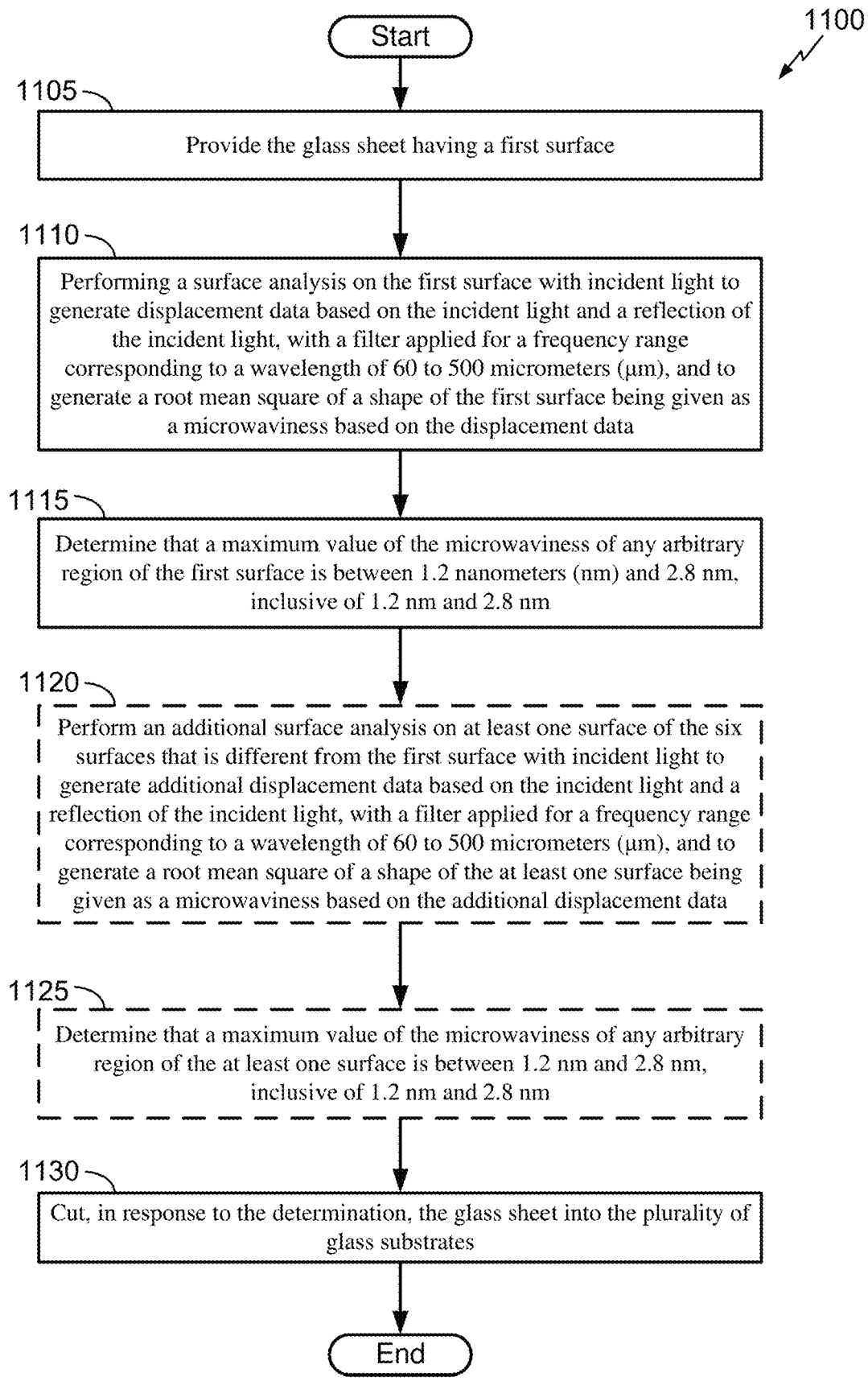
FIG. 11 illustrates a method for fabricating a plurality of glass substrates from a glass sheet to be used for magnetic recording disks, in accordance with aspects of the disclosure.

In some aspects where the glass sheet is a substantially cuboid shape having six surfaces including the first surface, surface analysis component 1020 may be further configured to perform an additional surface analysis on at least one surface of the six surfaces that is different from the first surface with incident light to generate additional displacement data based on the incident light and a reflection of the incident light, with a filter applied for a frequency range corresponding to a feature wavelength of 60 to 500 micrometers (μm), and to generate a root mean square of a shape of the at least one surface being given as a microwaviness based on the additional displacement data, and to determine that a maximum value of the microwaviness of any arbitrary region of the at least one surface is between 1.2 nm and 2.8 nm, inclusive of 1.2 nm and 2.8 nm. In this aspect, the fabrication management component 1030 may be configured to cut the glass sheet into the plurality of glass substrates in response to the determination that that the maximum value of the microwaviness of any arbitrary region of the first surface and the maximum value of the microwaviness of any arbitrary region of the at least one surface are between 1.2 nm and 2.8 nm, inclusive of 1.2 nm and 2.8 nm FIG. 11 illustrates a method 1100 for fabricating a plurality of glass substrates from a glass sheet to be used for magnetic recording disks, in accordance with aspects of the disclosure. At block 1105, a glass substrate fabrication apparatus (e.g., surface analysis component 1020 of the glass substrate fabrication apparatus 1000) may provide the glass sheet having a first surface. In an aspect, the glass sheet may be made of unpolished glass configured to be cut into the plurality of glass substrates for the magnetic recording disks. At block 1110, the glass substrate fabrication apparatus (e.g., surface analysis component 1020 of the glass substrate fabrication apparatus 1000) may perform a surface analysis on the first surface with incident light to generate displacement data based on the incident light and a reflection of the incident light, with a filter applied for a frequency range corresponding to a feature wavelength of 60 to 500 micrometers ($\mu m$), and to generate a root mean square of a shape of the first surface being given as a microwaviness based on the displacement data. In an aspect, the surface analysis may be performed using a laser Doppler vibrometer. In an aspect, a range of the feature wavelength of 60 to 500 micrometers ($\mu m$) is based on a size of a laser utilized by the laser Doppler vibrometer and a length of a slider for reading a magnetic recording disk. At block 1115, the glass substrate fabrication apparatus (e.g., surface analysis component 1020 of the glass substrate fabrication apparatus 1000) may determine that a maximum value of the microwaviness of any arbitrary region of the first surface is between 1.2 nanometers (nm) and 2.8 nm, inclusive of 1.2 nm and 2.8 nm. In an aspect, the maximum value of the microwaviness of any arbitrary region of the first surface may be between 1.2 nm and 2.5 nm, inclusive of 1.2 nm and 2.5 nm.

In an aspect, where the glass sheet has a substantially cuboid shape having six surfaces including the first surface, at block 1120, the glass substrate fabrication apparatus (e.g., surface analysis component 1020 of the glass substrate fabrication apparatus 1000) may perform an additional surface analysis on at least one surface of the six surfaces that is different from the first surface with incident light to generate additional displacement data based on the incident light and a reflection of the incident light, with a filter applied for a frequency range corresponding to a feature wavelength of 60 to 500 micrometers ($\mu m$), and to generate a root mean square of a shape of the at least one surface being given as a microwaviness based on the additional displacement data. In an aspect, at block 1125, the glass substrate fabrication apparatus (e.g., surface analysis component 1020 of the glass substrate fabrication apparatus 1000) may determine that that a maximum value of the microwaviness of any arbitrary region of the at least one surface is between 1.2 nm and 2.8 nm, inclusive of 1.2 nm and 2.8 nm.

At block 1130, the glass substrate fabrication apparatus (e.g., fabrication management component 1030 of the glass substrate fabrication apparatus 1000) may cut, in response to the determination, the glass sheet into the plurality of glass substrates.

In some aspects, at block 1130, the cutting of the glass sheet into the plurality of glass substrates may be performed further in response to the determination that the maximum value of the microwaviness of any arbitrary region of the at least one surface is between 1.2 nm and 2.8 nm, inclusive of 1.2 nm and 2.8 nm. In an example fabrication process, the glass sheet may be first cut into the glass substrates (e.g., according to block 1130). The glass substrates may be further cut to make them into doughnut shaped substrates (e.g., adding a center hole). Subsequently, each glass substrate may be polished on a top surface, a bottom surface, an edge of an inner diameter of the glass substrate, and an edge of an outer diameter of the glass substrate. After the polishing, a magnetic recording layer structure may be deposited on each glass substrate to form a magnetic recording media.

In an aspect, a thickness variation measurement of the glass sheet, as defined by a thickness difference of any two arbitrary points on the first surface, may be equal to or less than 2 micrometers ($\mu m$). In an aspect, a distance between the any two arbitrary points may be greater than or equal to a distance between an inner diameter and an outer diameter of at least one of the magnetic recording disks. In an aspect, the any two arbitrary points may be at least 45 millimeters (mm) apart.

In an aspect, a thickness of the glass sheet may be a distance between the first surface and a second surface of the glass sheet, the second surface being substantially parallel to the first surface, where the thickness of the glass sheet may be in a range of at least one of 0.6-0.65 millimeters (mm), 0.5-0.55 mm, 0.4-0.45 mm, 0.41-0.46 mm, 0.38-0.43 mm, or 0.3-0.35 mm.

In an aspect, a thickness of the glass sheet may be a distance between the first surface and a second surface of the glass sheet, the second surface being substantially parallel to the first surface, where a thickness variation of the thickness within a radius of 50 millimeters (mm) from any arbitrary point on the first surface or on the second surface may be less than 2 micrometers ($\mu m$).

In an aspect, a flatness on the first surface may be defined as a distance between a first reference plane defined by three first points of the first surface farthest from a center plane and a deepest point of the first surface closest to the center plane, the center plane being located between the first surface and the second surface and being substantially parallel to the first surface. In this aspect, the flatness within a radius of 50 millimeters (mm) from any arbitrary point on the first surface or the second surface may be less than 8 micrometers ($\mu m$).

Figure 12:
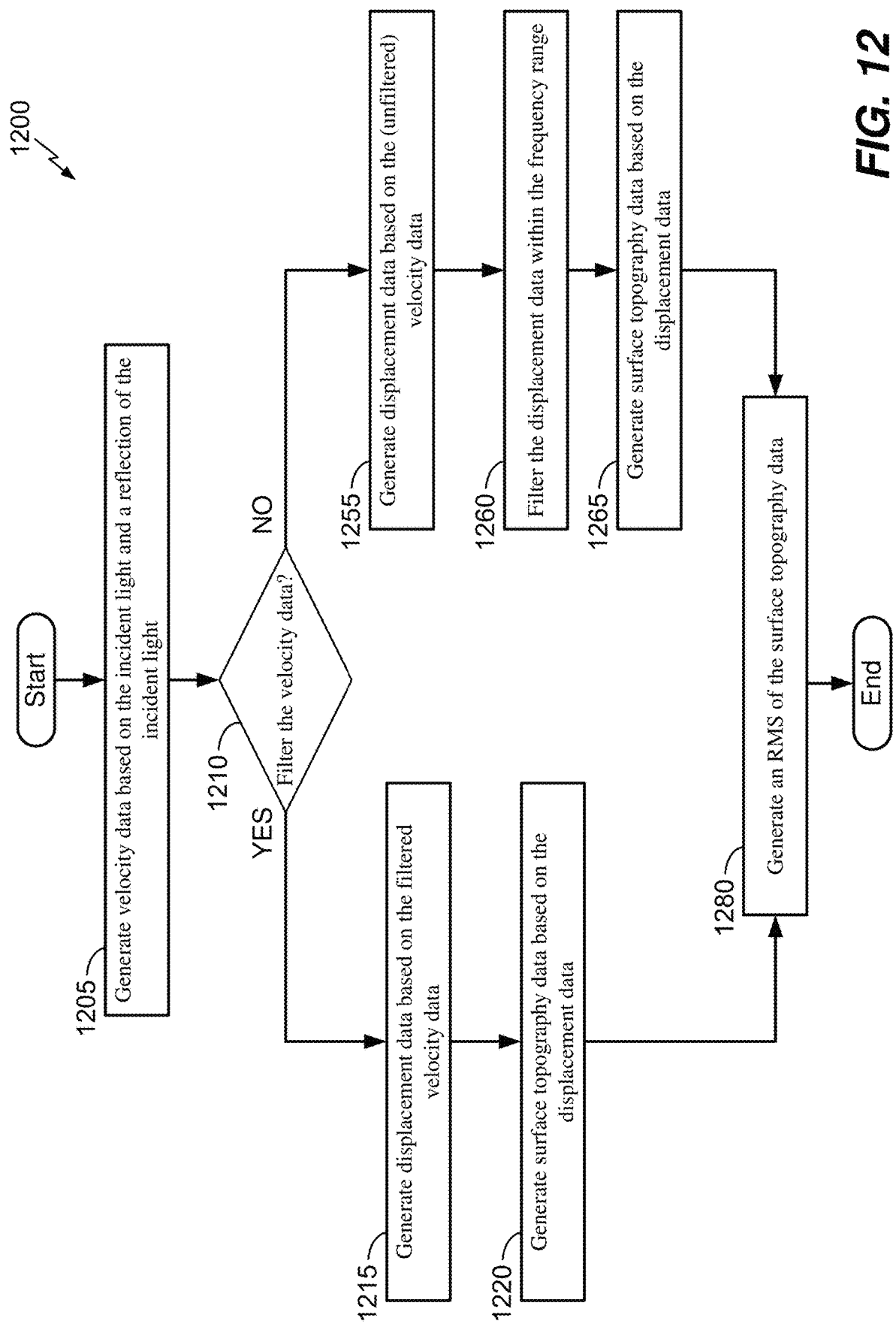
FIG. 12 illustrates a method for performing a surface analysis on a surface of a glass substrate from a glass sheet to be used for magnetic recording disks, in accordance with aspects of the disclosure.

FIG. 12 illustrates a method 1200 for performing a surface analysis on a surface of a glass substrate from a glass sheet to be used for magnetic recording disks, in accordance with aspects of the disclosure. At block 1205, a glass substrate fabrication apparatus (e.g., surface analysis component 1020 of the glass substrate fabrication apparatus 1000) may generate velocity data based on the incident light and a reflection of the incident light. The incident light may be from a laser Doppler vibrometer (e.g., laser Doppler vibrometer 1060). At block 1210, the glass substrate fabrication apparatus may determine whether to apply a filter to the velocity data to filter the velocity data within a frequency range corresponding to the feature wavelength of 60 to 500 $\mu m$.

If the filter is applied to the velocity data, at block 1215, the glass substrate fabrication apparatus may generate displacement data based on the filtered velocity data. For example, the displacement data may be generated by calculating a movement of a point, which may be determined by multiplying the filtered velocity data with a sensitivity of the laser Doppler vibrometer and time, as shown in Equation (3) above. Then, at block 1220, the glass substrate fabrication apparatus may generate surface topography data based on the displacement data. For example, the topography data may be generated by calculating integrals of the displacement data. In an example, the topography data may be calculated by taking integrals of the displacement data, based on Equation (4) above.

If the filter is not applied to the velocity data, at block 1255, the glass substrate fabrication apparatus may generate displacement data based on the velocity data that is not filtered using the filter. For example, the displacement data may be generated by calculating a movement of a point, which may be determined by multiplying the velocity data with a sensitivity of the laser Doppler vibrometer and time, as shown in Equation (3) above. Then, at block 1260, the glass substrate fabrication apparatus may apply a filter to the displacement data to filter the displacement data within the frequency range corresponding to the feature wavelength of 60 to 500 μm. Subsequently, at block 1265, the glass substrate fabrication apparatus may generate surface topography data based on the filtered displacement data. For example, the topography data may be generated by calculating integrals of the filtered displacement data. In an example, the topography data may be calculated by taking integrals of the filtered displacement data, based on Equation (4) above.

After generating the surface topography data either at block 1220 or at block 1265, at block 1280, the glass substrate fabrication apparatus may generate an RMS of the surface topography data, which may be used to determine a microwaviness.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

What is claimed is:

1. A glass sheet configured to be cut into a plurality of glass substrates for magnetic recording disks, comprising:
    a first surface,
    wherein, for surface features of the first surface with a feature wavelength of 60 to 500 micrometers (μm), a root mean square of a surface topography of the surface features determined using a surface analysis on the first surface with incident and reflected light is given as a microwaviness, and
    wherein a maximum value of the microwaviness of any arbitrary region of the first surface is between 1.2 nanometers (nm) and 2.8 nm, inclusive of 1.2 nm and 2.8 nm, and
    wherein the microwaviness is based on the root mean square of the surface topography of the surface features determined using displacement data generated by the surface analysis on the first surface with a filter applied for a frequency range corresponding to the feature wavelength of 60 to 500 μm.

2. The glass sheet of claim 1, wherein the glass sheet is a substantially cuboid shape having six surfaces including the first surface, and
    wherein, for second surface features of at least one surface of the six surfaces that is different from the first surface with a feature wavelength of 60 to 500 micrometers (μm), a root mean square of a surface topography of the second surface features determined using a surface analysis on the at least one surface with incident and reflected light is given as a microwaviness, and
    wherein a maximum value of the microwaviness of any arbitrary region of the at least one surface is between 1.2 nm and 2.8 nm, inclusive of 1.2 nm and 2.8 nm.

3. The glass sheet of claim 1, wherein the microwaviness is measured using a laser Doppler vibrometer.

4. The glass sheet of claim 3, wherein a range of the feature wavelength of 60 to 500 micrometers (μm) is based on a size of a laser utilized by the laser Doppler vibrometer and a length of a slider for reading a magnetic recording disk.

5. The glass sheet of claim 1, wherein the maximum value of the microwaviness of any arbitrary region of the first surface is between 1.2 nm and 2.5 nm, inclusive of 1.2 nm and 2.5 nm.

6. The glass sheet of claim 1, wherein a thickness variation measurement of the glass sheet, as defined by a height difference of any two arbitrary points on the first surface, is equal to or less than 2 micrometers (um).

7. The glass sheet of claim 6, wherein a distance between the any two arbitrary points is greater than or equal to a distance between an inner diameter and an outer diameter of at least one of the magnetic recording disks.

8. The glass sheet of claim 6, wherein the any two arbitrary points are at least 45 millimeters (mm) apart.

9. The glass sheet of claim 1, wherein a thickness of the glass sheet is a distance between the first surface and a second surface of the glass sheet, the second surface being substantially parallel to the first surface, and
    wherein the thickness of the glass sheet is in a range of at least one of: 0.6-0.65 millimeters (mm), 0.5-0.55 mm, 0.4-0.45 mm, 0.41-0.46 mm, 0.38-0.43 mm, or 0.3-0.35 mm.

10. The glass sheet of claim 1:
    wherein a thickness of the glass sheet is a distance between the first surface and a second surface of the glass sheet, the second surface being substantially parallel to the first surface, and wherein a thickness variation of the thickness within a radius of 50 millimeters (mm) from any arbitrary point on the first surface is less than 2 micrometers (μm).

11. The glass sheet of claim 1:

wherein a flatness within a radius of 50 millimeters (mm) from any arbitrary point on the first surface or a second surface of the glass sheet is less than 8 micrometers (μm), and wherein the flatness on the first surface is defined as a distance between a first reference plane defined by three first points of the first surface farthest from a center plane and a deepest point of the first surface closest to the center plane, the center plane being located between the first surface and the second surface and being substantially parallel to the first surface.

12. The glass sheet of claim 1, wherein the glass sheet is made of unpolished glass configured to be cut into the plurality of glass substrates for the magnetic recording disks.

13. A glass sheet configured to be cut into a plurality of glass substrates for magnetic recording disks, comprising:

a first surface, the first surface comprising a predefined number of discrete first surface regions of equal size, wherein, for surface features of each of the first surface regions with a feature wavelength of 60 to 500 micrometers (um), a root mean square of a surface topography of the surface features determined using a surface analysis on a respective one of the first surface regions with incident and reflected light is given as a microwaviness, and wherein a maximum value of the microwaviness of each of the first surface regions is between 1.2 nanometers (nm) and 2.8 nm, inclusive of 1.2 nm and 2.8 nm, and wherein the microwaviness is based on the root mean square of the surface topography of the surface features determined using displacement data generated by the surface analysis on the first surface with a filter applied for a frequency range corresponding to the feature wavelength of 60 to 500 μm.

14. The glass sheet of claim 13, wherein at least one of the first surface regions of the first surface includes a disk region to be cut into a disk for a magnetic recording disk, wherein, for disk region surface features of the disk region with a feature wavelength of 60 to 500 micrometers (μm), a root mean square of a surface topography of the disk region surface features determined using a surface analysis on the disk region with incident and reflected light is given as a microwaviness of the disk region, and wherein a maximum value of the microwaviness of the disk region is between 1.2 nanometers (nm) and 2.8 nm, inclusive of 1.2 nm and 2.8 nm.

15. The glass sheet of claim 1, wherein the glass sheet is selected for fabricating the plurality of glass substrates using a method comprising:

providing the glass sheet having the first surface;

performing the surface analysis on the first surface with the incident light to generate displacement data based on the incident light and a reflection of the incident light, with a filter applied for a frequency range corresponding to the feature wavelength of 60 to 500 μm, and to generate the root mean square of a shape of the first surface being given as the microwaviness based on the displacement data;

determining that the maximum value of the microwaviness of any arbitrary region of the first surface is between 1.2 nm and 2.8 nm, inclusive of 1.2 nm and 2.8 nm; and selecting, in response to the determination, the glass sheet to be cut into the plurality of glass substrates.

16. The glass sheet of claim 15, wherein the glass sheet is a substantially cuboid shape having six surfaces including the first surface, and wherein the method further comprises:

performing an additional surface analysis on at least one surface of the six surfaces that is different from the first surface with incident light to generate additional displacement data based on the incident light and a reflection of the incident light, with a filter applied for a frequency range corresponding to a feature wavelength of 60 to 500 micrometers (μm), and to generate a root mean square of a shape of the at least one surface being given as a microwaviness based on the additional displacement data; and determining that a maximum value of the microwaviness of any arbitrary region of the at least one surface is between 1.2 nm and 2.8 nm, inclusive of 1.2 nm and 2.8 nm, wherein the selecting the glass sheet to be cut into the plurality of glass substrates is performed further in response to the determination that the maximum value of the microwaviness of any arbitrary region of the at least one surface is between 1.2 nm and 2.8 nm, inclusive of 1.2 nm and 2.8 nm.

* * * * *